United States Patent
Guan

(10) Patent No.: US 9,449,220 B2
(45) Date of Patent: Sep. 20, 2016

(54) SYSTEMS AND METHODS FOR COOKWARE DETECTION

(71) Applicant: General Electric Company, Schenectady, NY (US)

(72) Inventor: Li Guan, Clifton Park, NY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 225 days.

(21) Appl. No.: 14/257,267

(22) Filed: Apr. 21, 2014

(65) Prior Publication Data

US 2015/0302276 A1    Oct. 22, 2015

(51) Int. Cl.
*G06K 9/34* (2006.01)
*G06K 9/00* (2006.01)
*G06K 9/62* (2006.01)
*G06K 9/68* (2006.01)

(52) U.S. Cl.
CPC ....... *G06K 9/00335* (2013.01); *G06K 9/00771* (2013.01); *G06K 9/627* (2013.01); *G06K 9/6255* (2013.01); *G06K 9/6857* (2013.01)

(58) Field of Classification Search
None
See application file for complete search history.

(56) References Cited

U.S. PATENT DOCUMENTS

| 6,301,521 | B1 | 10/2001 | Chen et al. | |
| 6,999,614 | B1* | 2/2006 | Bakker | G06T 7/0004 |
| | | | | 382/145 |
| 8,079,079 | B2 | 12/2011 | Zhang | |
| 8,439,683 | B2 | 5/2013 | Puri et al. | |
| 8,861,884 | B1* | 10/2014 | Fang | G06T 5/003 |
| | | | | 382/255 |
| 8,934,709 | B2* | 1/2015 | Saptharishi | G06K 9/00771 |
| | | | | 382/159 |
| 2007/0064107 | A1* | 3/2007 | Aggarwal | H04N 7/181 |
| | | | | 348/143 |
| 2009/0087027 | A1* | 4/2009 | Eaton | G06F 15/16 |
| | | | | 382/103 |
| 2009/0132530 | A1* | 5/2009 | Chen | G06F 17/30864 |
| 2010/0119755 | A1 | 5/2010 | Chung | |
| 2010/0158356 | A1 | 6/2010 | Ranzato et al. | |
| 2010/0182136 | A1 | 7/2010 | Pryor | |
| 2010/0231506 | A1 | 9/2010 | Pryor | |
| 2011/0253693 | A1* | 10/2011 | Lyons | A47J 27/00 |
| | | | | 219/209 |
| 2013/0142417 | A1* | 6/2013 | Kutliroff | G06K 9/00355 |
| | | | | 382/159 |
| 2013/0228564 | A1* | 9/2013 | Jungbauer | F24C 7/083 |
| | | | | 219/452.12 |
| 2013/0229346 | A1* | 9/2013 | Jungbauer | G06F 3/017 |
| | | | | 345/158 |
| 2013/0243241 | A1* | 9/2013 | Shaick | G06K 9/00261 |
| | | | | 382/103 |

(Continued)

FOREIGN PATENT DOCUMENTS

| CN | 102121906 | 7/2011 |
| EP | 1 505 350 A2 | 2/2005 |
| JP | 2003307311 | 10/2003 |

OTHER PUBLICATIONS

Boiler Flame Image classification-Model, Han et al., IEEE, 1-4244-0497-5, 2006, pp. 575-578.*

*Primary Examiner* — Jayesh A Patel
(74) *Attorney, Agent, or Firm* — Dority & Manning, P.A.

(57) ABSTRACT

Systems and methods for cookware detection are provided. One example system includes a vision sensor positioned so as to collect a plurality of images of a cooktop. The system includes a classifier module implemented by one or more processors. The classifier module is configured to calculate a cookware score for each of the plurality of images and to use the cookware score for each of the plurality of images to classify such image as either depicting cookware or not depicting cookware. The system includes a classifier training module implemented by the one or more processors. The classifier training module is configured to train the classifier module based at least in part on a positive image training dataset and a negative image training dataset.

16 Claims, 7 Drawing Sheets

(56) References Cited

U.S. PATENT DOCUMENTS

2014/0270358 A1* 9/2014 Zhu .................. G06K 9/00369 382/103

2014/0334734 A1* 11/2014 Xiong ................ G06K 9/00288 382/195

2015/0286891 A1 10/2015 Guan

* cited by examiner

US 9,449,220 B2

SYSTEMS AND METHODS FOR COOKWARE DETECTION

FIELD OF THE INVENTION

The present disclosure relates generally to systems and methods for cookware detection. More particularly, the present disclosure is directed to systems and methods for cookware detection in which a classifier used for analyzing imagery of a cooktop to detect the presence of cookware on a cooktop can be periodically re-trained.

BACKGROUND OF THE INVENTION

In many situations it is desirable to know whether or not an item of cookware is present upon a cooktop. For example, knowledge of the presence or absence of cookware on a cooktop can be used to increase user safety, reduce energy expenditure, and/or perform other "smart" operations.

However, certain existing systems for detecting the presence of cookware suffer from various drawbacks. As an example, a motion sensor can be used to detect motion around the cooktop. However, detection of motion does not provide precise information as to whether an item of cookware is present on the cooktop. For example, a user may be operating an adjacent appliance and cause the motion sensor to provide a false positive for cookware detection.

As another example, a pressure sensor can be used to detect the presence of an object placed upon the cooktop. However, detection of an object does not necessarily provide accurate cookware detection either. For example, a pet such as a cat may be sitting on the cooktop and trigger a false cookware detection.

As yet another example, specialized cookware may be used that has built-in circuitry or other sensors that communicate with the cooktop or other appliances to indicate the presence of the cookware. However, such specialized cookware can be too expensive for an average user to find desirable. Alternatively, the user may already have an existing set of cookware and therefore be reluctant to purchase additional specialized cookware.

Therefore, systems and methods for cookware detection that provide improved accuracy without significantly increasing cost are desirable.

BRIEF DESCRIPTION OF THE INVENTION

Additional aspects and advantages of the invention will be set forth in part in the following description, or may be apparent from the description, or may be learned through practice of the invention.

One aspect of the present disclosure is directed to a method for detecting cookware. The method includes obtaining, by one or more computing devices, a frame of imagery captured by a vision sensor, the frame of imagery depicting a cooktop. The method includes using, by the one or more computing device, a classifier to provide an initial classification for the frame of imagery, the initial classification classifying the frame of imagery into either a first class of images depicting cookware or a second class of images not depicting cookware. The method includes providing, by the one or more computing devices, an indication to a user of whether the initial classification comprises the first class or the second class. The method includes, after providing the indication, receiving, by the one or more computing devices, a user input indicating whether the initial classification is correct. The method includes, changing, by the one or more computing devices, the initial classification for the frame of imagery to a subsequent classification when the user input indicates that the initial classification is not correct. The subsequent classification comprises the second class when the initial classification comprises the first class. The subsequent classification comprises the first class when the initial classification comprises the second class.

Another aspect of the present disclosure is directed to a system for detecting cookware. The system includes a vision sensor positioned so as to collect imagery depicting a cooktop. The system includes one or more processors and one or more non-transitory computer-readable media storing instructions that, when executed by the one or more processors, cause the one or more processors to perform operations. The operations include obtaining a first plurality of images. The first plurality of images depict cookware upon the cooktop. The operations include storing the first plurality of images in a memory as a positive image training dataset. The operations include obtaining a second plurality of images. The second plurality of images do not depict cookware upon the cooktop. The operations include storing the second plurality of images in the memory as a negative image training dataset. The operations include training a classifier based on the positive image training dataset and the negative image training dataset. The operations include using the classifier to provide an initial classification for a frame of imagery captured by the vision sensor. The initial classification classifies the frame of imagery into either a first class of images depicting cookware or a second class of images not depicting cookware.

Another aspect of the present disclosure is directed to a system for detecting cookware. The system includes a vision sensor positioned so as to collect a plurality of images of a cooktop. The system includes a classifier module implemented by one or more processors. The classifier module is configured to calculate a cookware score for each of the plurality of images and to use the cookware score for each of the plurality of images to classify such image as either depicting cookware or not depicting cookware. The system includes a classifier training module implemented by the one or more processors. The classifier training module is configured to train the classifier module based at least in part on a positive image training dataset and a negative image training dataset.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
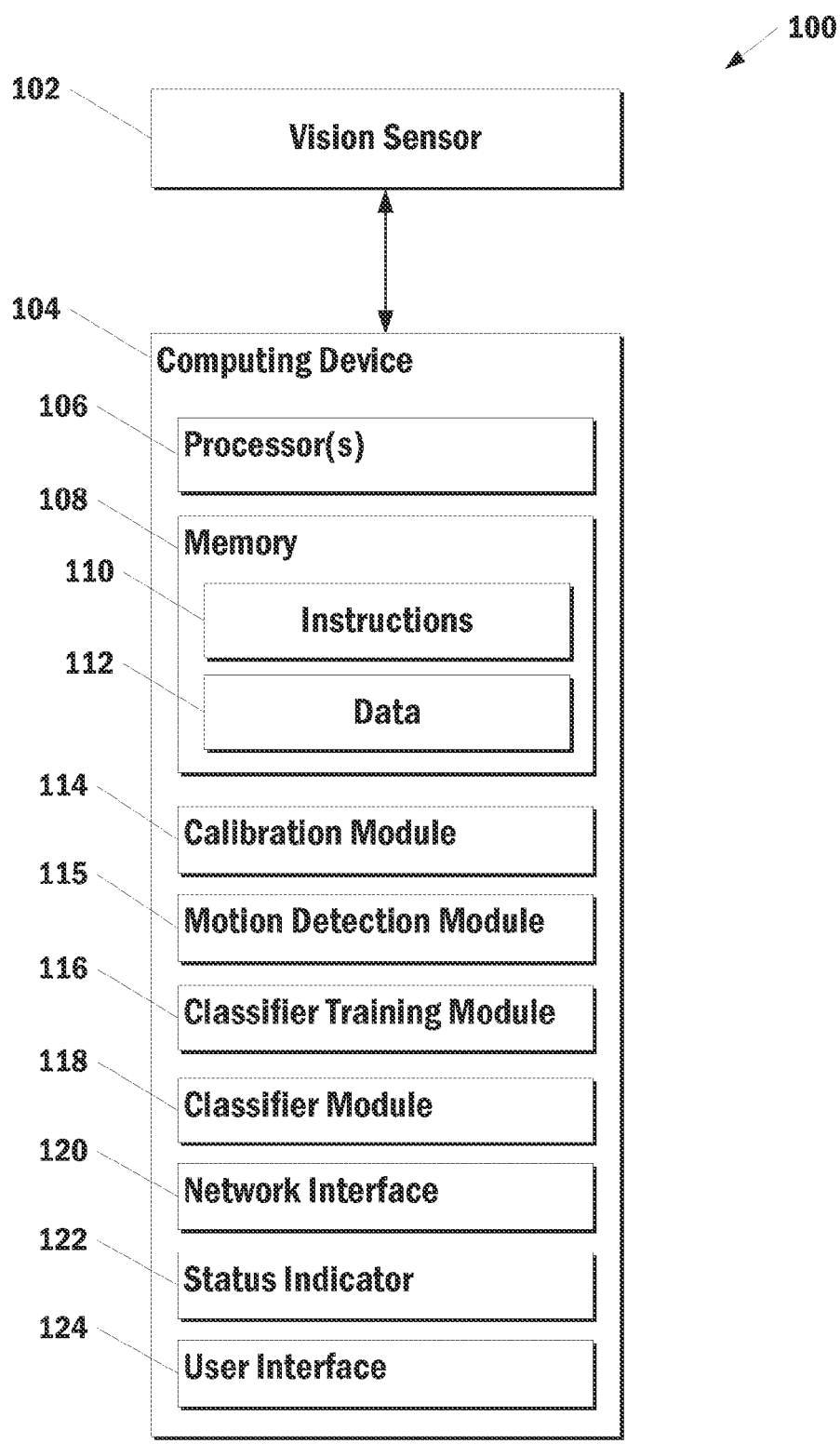
FIG. 1 depicts an example system according to an example embodiment of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

With reference now to the FIGS., example embodiments of the present disclosure will be discussed in further detail. FIG. 1 depicts an example system 100 according to an example embodiment of the present disclosure.

System 100 can include a vision sensor 102 that can exchange data with a computing device 104. As an example, the vision sensor 102 can be any suitable camera for capturing imagery. For example, in some embodiments, the vision sensor 102 can be a wide-angle lens VGA resolution video camera.

Figure 2:
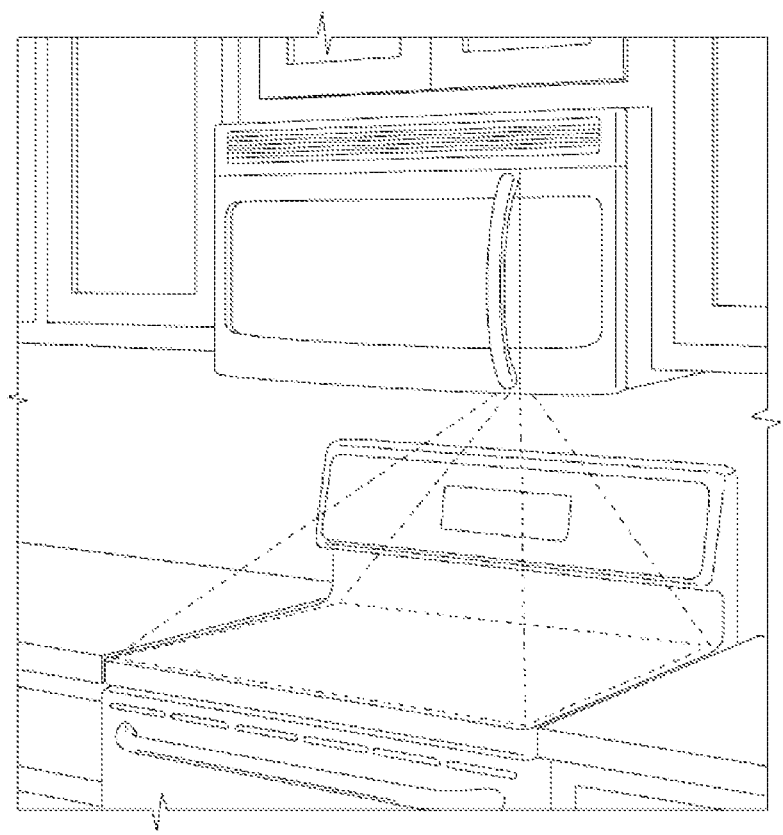
FIG. 2 depicts an example vision sensor capturing imagery depicting a cooktop according to an example embodiment of the present disclosure.

Vision sensor 102 can be positioned so as to collect imagery depicting a cooktop. For example, vision sensor 102 can be secured to the underside of an over the range microwave or hood and pointed downwards so that the view of the vision sensor generally corresponds to the dimensions of the cooktop. Other positions may be used as well. As an example, FIG. 2 depicts an example vision sensor capturing imagery depicting a cooktop according to an example embodiment of the present disclosure.

Referring again to FIG. 1, vision sensor 102 can collect a plurality of frames of imagery. For example, in some embodiments, computing device 104 can operate vision sensor 102 to collect about thirty frames per second of a VGA resolution video stream. The frame rate can be modifiable by the computing device 104.

Computing device 104 can be any device that includes one or more processors 106 and a memory 108. As an example, in some embodiments, computing device 104 can be a single board computer (SBC). For example, the computing device 104 can be a single System-On-Chip (SOC). Further, the vision sensor 102 can also be located on the same single circuit board. However, any form of computing device 104 can be used to perform the present disclosure.

The processor(s) 106 can be any suitable processing device, such as a microprocessor, microcontroller, integrated circuit, or other suitable processing devices or combinations thereof.

The memory 108 can include any suitable storage media, including, but not limited to, non-transitory computer-readable media, RAM, ROM, hard drives, flash drives, accessible databases, or other memory devices. The memory 108 can store information accessible by processor(s) 106, including instructions 110 that can be executed by processor(s) 106 to perform aspects of the present disclosure.

Memory 108 can also include data 112. Data 112 can store various types of information. In some embodiments, data 112 can store a positive training image dataset containing a plurality of images depicting cookware and a negative image training dataset containing a plurality of images that do not depict cookware. For example, some or all of the images in the training datasets can have been captured by vision sensor 102.

As another example, in some embodiments, data 112 can store a plurality of feature criteria with respect to which an image is analyzed to assist in classifying the image as either depicting cookware or not depicting cookware. For example, data 112 can include a plurality of high-dimensional planes respectively associated with the plurality of feature criteria that describe the image appearance of the two classes to be separated.

The plurality of planes can be predetermined and loaded into memory 108 by the manufacturer of system 100. Alternatively, according to an aspect of the present disclosure, the plurality of planes can be periodically re-determined and stored in memory 108 by a classifier training module 116, as will be discussed further below.

Computing device 104 can also include a number of modules to provide functionality or otherwise perform particular operations. It will be appreciated that the term "module" refers to computer logic utilized to provide desired functionality. Thus, a module can be implemented in hardware, application specific circuits, firmware and/or software controlling a general purpose processor. In one embodiment, modules are program code files stored on the storage device, loaded into memory and executed by a processor or can be provided from computer program products, for example computer executable instructions, that are stored in a tangible computer-readable storage medium such as RAM, hard disk or optical or magnetic media.

In some embodiments, computing device 104 can include a calibration module 114. Computing device 104 can implement calibration module 114 to identify one or more locations respectively associated with one or more burners included in a cooktop. For example, calibration module 114 can be implemented to identify the one or more locations respectively associated with the one or more burners by comparing reference imagery depicting the cooktop without objects placed thereon with calibration imagery depicting the cooktop with one or more objects respectively placed on the one or more burners.

As another example, calibration module 114 can be implemented to identify the one or more locations respectively associated with the one or more burners by comparing reference imagery depicting the cooktop without objects placed thereon with calibration imagery depicting the cooktop with one or more of the burners energized. For example, the calibration module 114 can detect the presence of a flame or other appearance change due to energization of the burners (e.g. glowing red).

As yet another example, in some embodiments, calibration module 114 can operate in association with vision sensor 102 to collect a first plurality of images that depict cookware and store such images in data 112 as the positive images training dataset. Calibration module 114 can also operate in association with vision sensor 102 to collect a second plurality of images that do not depict cookware and store such images in data 112 as the negative images training dataset.

In some embodiments, computing device 104 can also include a motion detection module 115. Motion detection module 115 can be implemented to compare two frames of imagery (e.g. consecutive frames) to determine whether the frames depict motion occurring in the depicted environment.

Computing device 104 can also include a classifier training module 116. Classifier training module 116 can be implemented to train a classifier module 118.

In particular, as an example, computing device 104 can implement classifier training module to analyze a positive training image dataset and a negative training image dataset to identify a plurality of image feature criteria that can be used to train a classifier module 118. For example, classifier training module 116 can be implemented to analyze the training image datasets to extract a plurality of image feature descriptors such as, for example, a Pyramid Histogram of Visual Words. The classifier training module 116 can then generate a codebook from the feature descriptors.

As another example, a plurality of planes can be respectively determined for the plurality of feature criteria. The plane for each feature criterion can represent an optimal separation between the sets of data points for the two classes for such feature criterion. For example, the planes can provide the largest distance to the nearest training data point of either class.

Computing device 104 can implement classifier module 118 to classify an image into one of a plurality of classes. In some embodiments, classifier module 118 can a binary classifier that classifies imagery captured by vision sensor 102 as either depicting an item of cookware or not depicting an item of cookware. For example, classifier module 118 can be a support vector machine or a random forest classifier.

As an example, in some embodiments, classifier module 118 can retrieve from memory 108 a plurality of planes respectively associated with a plurality of feature criteria and use the plurality of planes to classify an image as either depicting cookware or not depicting cookware. For example, classifier module 118 can use the plurality of planes to calculate a cookware score for a given image. For example, the cookware score can be a number or percentage of feature criteria for which the image is on the cookware side of the plane for such feature criterion. The image can then be classified on the basis of the cookware score. For example, the image can be classified as depicting cookware if the cookware score exceeds a threshold value.

Furthermore, classifier training module 116 can periodically re-train classifier module 118 on the basis of additional imagery collected by system 100. In particular, additional imagery depicting cookware can be collected during a calibration phase or during standard operations.

As an example, in each instance in classifier module 118 classifies an image or a segment of an image, system 100 can provide an indication to a user of whether the image was classified as depicting cookware or not depicting cookware. The user can then be given an opportunity to provide a user input indicating whether such classification is correct. When the user input indicates that the classification is incorrect, then the classification can be changed to a subsequent classification of a different class. Further, after changing the classification, the image or image segment can be added to either the positive image training dataset or the negative image training dataset, depending upon the subsequent classification. Classifier training module 116 can then re-train classifier module 118. In such fashion, user input can be used to assist in refining and re-training the classifier module 118 over time.

In some embodiments, computing device 104 can include a network interface 120. Network interface 120 can include any circuitry or components for communication over a network (e.g. a local area network or a wide area network). For example, computing device 104 can use network interface 120 to communicate with a cooktop appliance to provide the cooktop appliance with an indication of the presence and location of one or more items of cookware detected on the cooktop.

The cooktop appliance can use such information to provide enhanced safety features. For example, the cooktop appliance can energize a burner only when it receives an indication from computing device 104 that an item of cookware is located at such burner.

Computing device 104 can also include a status indicator 122. Status indicator 122 can be any suitable component or grouping of components for providing a status indicating whether cookware has been detected. As an example, status indicator 122 can include one or more light emitting devices (e.g. LEDs) that illuminate or flash upon detection of cookware or one or more speakers for providing an audible indication upon detection of cookware. Status indicator 122 may also include a display for displaying information such as, for example, textual instructions.

Computing device 104 can also include a user interface 124. User interface 124 can be any suitable component or grouping of components for receiving a user input. As an example, the user interface can include one or more buttons or other selectors that can be operated by a user. In some embodiments, user interface 124 can include a single button that the user presses when an incorrect classification is provided by classifier module 118.

As another example, user interface 124 can include a microphone for receiving human speech and an associated module for speech recognition. As yet another example, user interface 124 can include a module for interpreting human gestures captured by a vision sensor (e.g. vision sensor 102). For example, in some embodiments, user interface 124 can operate in association with vision sensor 102 and motion detection module 115 to analyze captured imagery to detect a particular gesture performed by a user and depicted by the imagery. However, any suitable user interface 124 for receiving user input can be used.

Computing device 104 can include other functionality as well. For example, in some embodiments, computing device 104 can include further modules for performing boil detection. In such embodiments, the computing device may analyze imagery for boil detection only after an item of cookware is detected at the cooktop.

Figure 3:
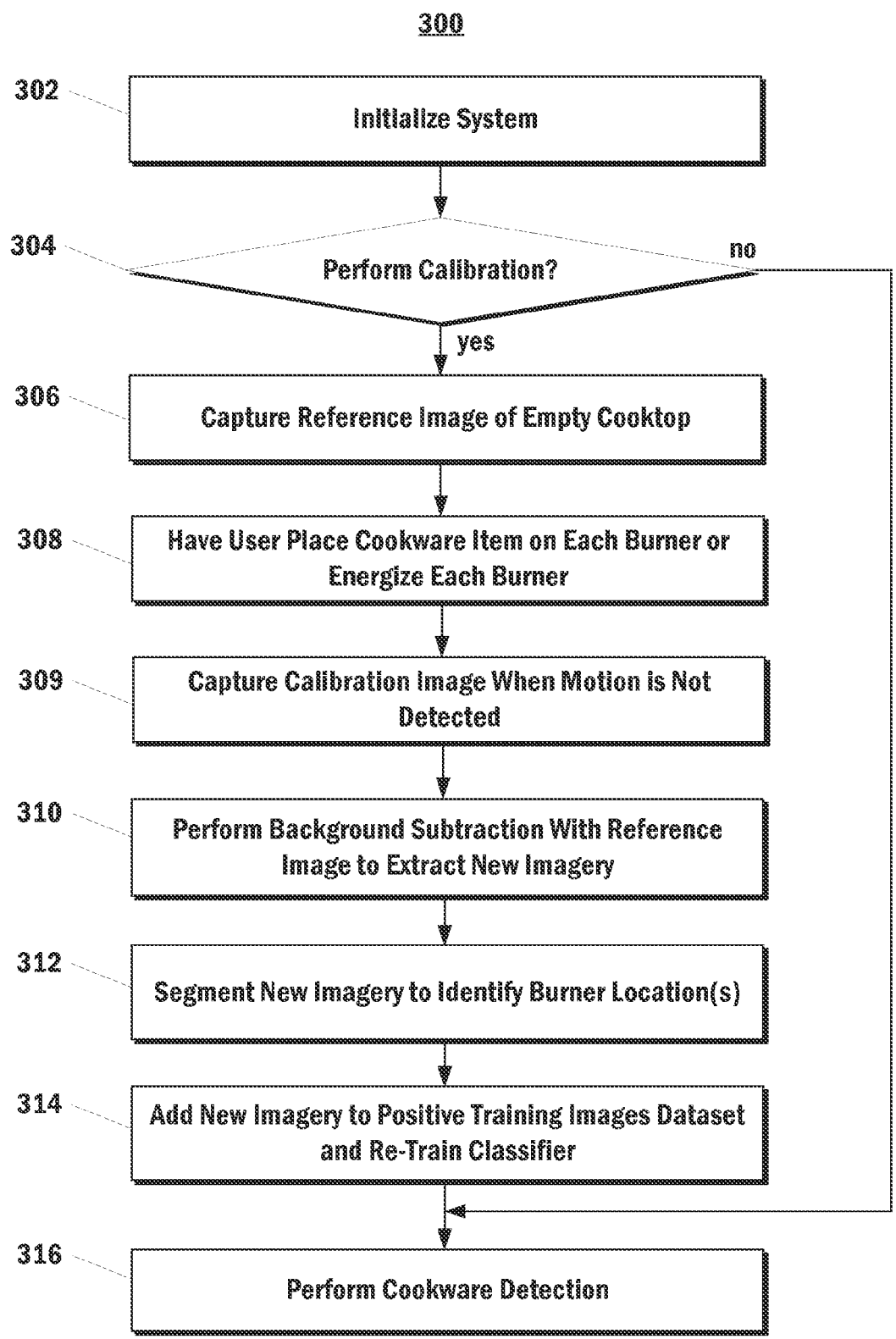
FIG. 3 depicts a flow chart of an example method for calibrating a system according to an example embodiment of the present disclosure.

FIG. 3 depicts a flow chart of an example method (300) for calibrating a system according to an example embodiment of the present disclosure. Although method (300) will be discussed with reference to system 100 of FIG. 1, method (300) can be performed by any suitable system.

In addition, FIG. 3 depicts steps performed in a particular order for purposes of illustration and discussion. Those of ordinary skill in the art, using the disclosures provided herein, will understand that the various steps of method (300) can be omitted, adapted, and/or rearranged in various ways without departing from the scope of the present disclosure.

At (302) the system can be initialized. For example, system 100 may receive power or otherwise be turned on.

At (304) it can be determined whether a calibration routine should be performed. As an example, in some embodiments, system 100 can be configured so that it performs a calibration routine upon its first system initialization after installation. Therefore, at (304) it can be determined whether a calibration routine has previously been performed (e.g. by checking a flag). If a routine has not yet been performed, then it may be appropriate to perform the calibration routine.

If it is determined at (304) that a calibration routine should not be performed, then method (300) can proceed to (316) and perform standard operations, such as collecting imagery and performing a cookware detection algorithm with respect to such imagery.

However, if it is determined at (304) that a calibration routine should be performed, then method (300) can proceed to (306).

At (306) a reference image of the cooktop without any objects placed thereon can be captured. For example, computing device 104 can operate vision sensor 102 to collect the reference image. The reference image can be stored in memory 108 for later use.

In some embodiments, system 100 can further include a display that provides visual instructions to the user or a speaker that provides audio instructions to the user so that the calibration process can be performed. In other embodiments, the system 100 can simply perform the calibration process and expect that the user will be provided with instructions independently (e.g. via a written manual provided with the product).

At (308) cookware items can be placed on one or more of the burners. Alternatively, one or more of the burners can be energized.

In particular, the calibration image should include new imagery at the locations of the burners so that the locations of the burners can be identified by comparing the reference image with the calibration image. Therefore, placing cookware on one or more of the burners will result in such new imagery being depicted by the calibration image. Likewise, energizing the burners can cause the burners to glow with heat, thereby providing new imagery. As yet another example, objects (e.g. pieces of paper or plastic) that are visually different than the burner surfaces can be placed on the burner to provide new imagery to be captured in the calibration image.

At (309) a calibration image can be captured when motion is not detected at the cooktop. For example, motion detection module 115 can be implemented to determine whether there is any motion between two consecutive frames of imagery. In particular, the new imagery included in the calibration image used for burner localization should include only the object(s) newly stationed on the burner(s) or the appearance change of the energized burner(s), but not human hands or other objects in motion while transitioning from the empty cooktop to the covered or energized cooktop used for calibration. Therefore, at (309) a plurality of frames of imagery captured by the vision sensor can be analyzed to determine when no motion is detected. When no motion is detected, the calibration image can be captured (e.g. the most recently captured frame can be used as the calibration image).

At (310) background subtraction can be performed for the calibration image captured at (309) with respect to the reference image captured at (306), such that the new imagery can be located.

At (312) the new imagery can be segmented to identify one or more locations respectively associated with the one or more burners.

In some embodiments, steps (308) through (310) are performed for each of a plurality of burners. Thus, for example, if there are four burners included in the cooktop, then four calibration images can be captured that respectively depict new imagery at the respective burner locations. Each calibration image can be compared with the reference image to identify one of the burner locations. As such, segmentation at step (312) is not needed.

Optionally, at (314) the new imagery can be added to a positive training images dataset and a classifier can be re-trained. For example, in the instance that the calibration images depict cookware at one or more of the burner locations, the new imagery extracted at (310) for such burner locations can be added to the positive training images dataset and classifier training module 116 can re-train classifier module 118.

After (314) method (300) can proceed to (316) and perform standard operations, such as collecting imagery and performing a cookware detection algorithm with respect to such imagery.

Figure 4:
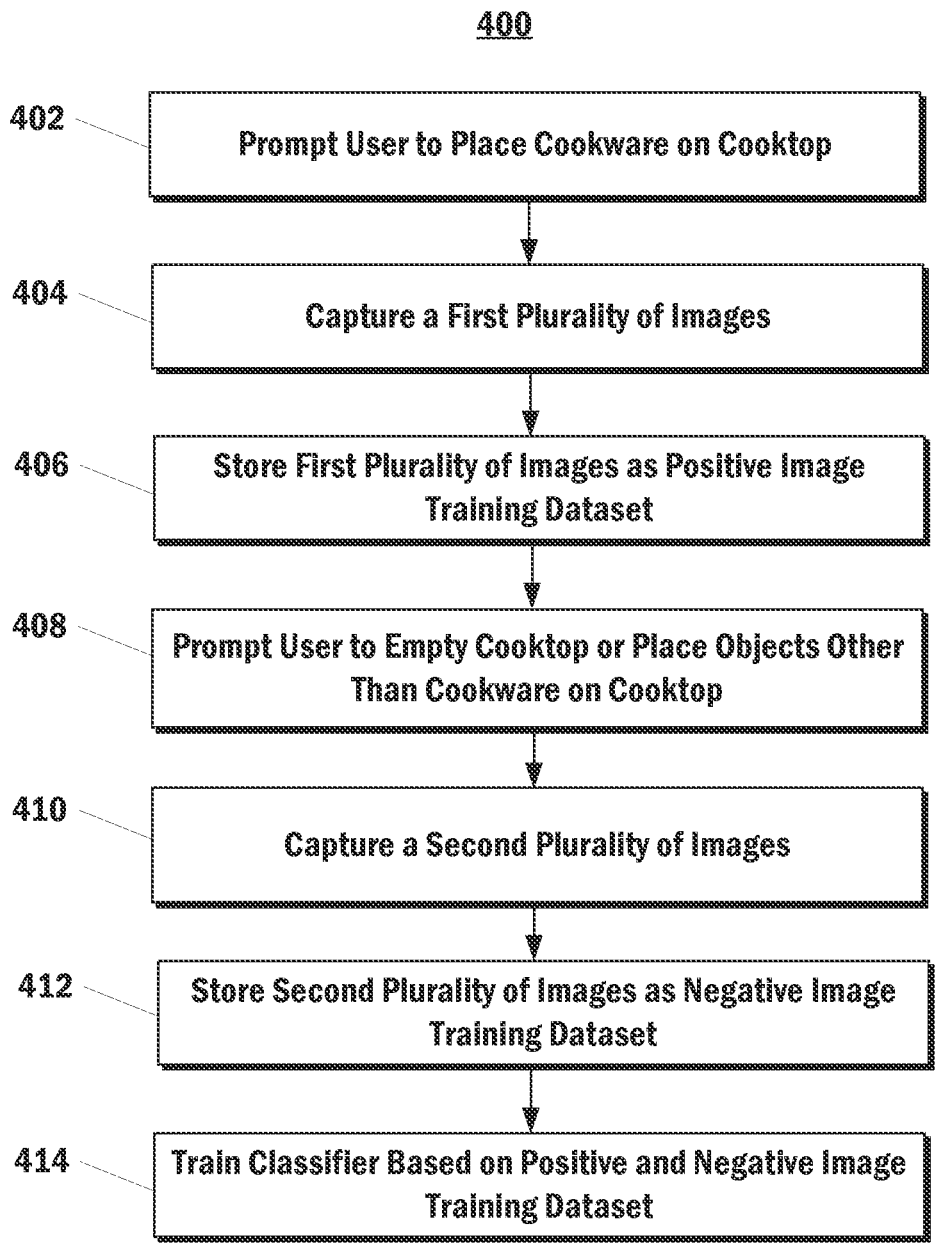
FIG. 4 depicts a flow chart of an example method for training a classifier according to an example embodiment of the present disclosure.

FIG. 4 depicts a flow chart of an example method (400) for training a classifier according to an example embodiment of the present disclosure. Although method (400) will be discussed with reference to system 100 of FIG. 1, method (400) can be performed by any suitable system.

In addition, FIG. 4 depicts steps performed in a particular order for purposes of illustration and discussion. Those of ordinary skill in the art, using the disclosures provided herein, will understand that the various steps of method (400) can be omitted, adapted, and/or rearranged in various ways without departing from the scope of the present disclosure.

At (402) a user can be prompted place cookware on a cooktop. For example, system 100 can operate status indicator 122 or user interface 124 to provide a prompt to the user to place cookware on the cooktop.

In other embodiments, the system 100 can simply perform the method (400) without explicit prompts and expect that the user will be provided with instructions independently (e.g. via a written manual provided with the product). Alternatively, the instructions may simply assist the user in interpreting the prompts.

At (404) a first plurality of images can be captured. For example, system 100 can operate vision sensor 102 to capture a plurality of images which depict the cookware on the cooktop.

As an example, in some implementations, the user can be prompted to place various items of cookware at different burner locations while a series of images are captured. For example, one of the series of images can be captured for each instance in which motion detection module 115 determines that motion is no longer detected.

At (406) the first plurality of images can be stored as a positive image training dataset. For example, the first plurality of images can be stored in data 112. In some implementations, the positive image training dataset may already exist and, therefore, the first plurality of images can be added to or otherwise supplement the positive image training dataset at (406). In such fashion, imagery depicting the user's particular cookware can be used to provide user-specific positive training images so that the resulting classifier is highly accurate to the particular cookware set owned by the user.

Furthermore, various techniques such as background subtraction with respect to a reference image or cropping based on known burner locations can be used to isolate and extract the new imagery that particularly depicts the cookware in the first plurality of images. The extracted new imagery can be added to the positive image training dataset at (406).

At (408) the user can be prompted to empty the cooktop or to place objects other than cookware on the cooktop. For example, system 100 can operate status indicator 122 or user interface 124 to provide a prompt to the user to remove cookware from the cooktop and/or place other objects on the cooktop.

In other embodiments, the system 100 can simply perform the method (400) without explicit prompts and expect that the user will be provided with instructions independently (e.g. via a written manual provided with the product). Alternatively, the instructions may simply assist the user in interpreting the prompts.

At (410) a second plurality of images can be captured. For example, system 100 can operate vision sensor 102 to capture a plurality of images which depict the cooktop in an empty state or with other non-cookware objects placed thereon.

At (412) the second plurality of images can be stored as a negative images training dataset. For example, the second plurality of images can be stored in data 112. In some implementations, the negative image training dataset may already exist and, therefore, the second plurality of images can be added to or otherwise supplement the negative image training dataset at (412). In such fashion, imagery specifically depicting the user's cooktop without cookware thereon can be used as negative training images so that the resulting classifier is highly accurate to classify images depicting such scenario.

At (414) a classifier can be trained based at least in part on the positive and negative image training datasets. For example, classifier training module 116 can be implemented to train classifier module 118 based on the positive and negative image training datasets. In such fashion, cooktop-specific images can be used to train a general classifier to provide high accuracy classification for a specific set of objects (e.g. cookware) within a particular context.

Furthermore, although method (400) of FIG. 4 includes providing prompts to the user to indicate the beginning and endings of certain portions of the training phases, in some embodiments, the user is provided with control over when such training phases begin and end. For example, instead of providing a prompt to the user at (402), in some embodiments, the system can instead receive user input indicating that the user is placing cookware on the cooktop for the purposes of capturing images to be contributed to the positive image training dataset. Likewise, instead of providing a prompt to the user at (408), in some embodiments, the system can instead receive a second user input indicating that the user is emptying the cooktop or placing other objects on the cooktop for the purposes of capturing images to be contributed to the negative image training dataset.

Figure 5:
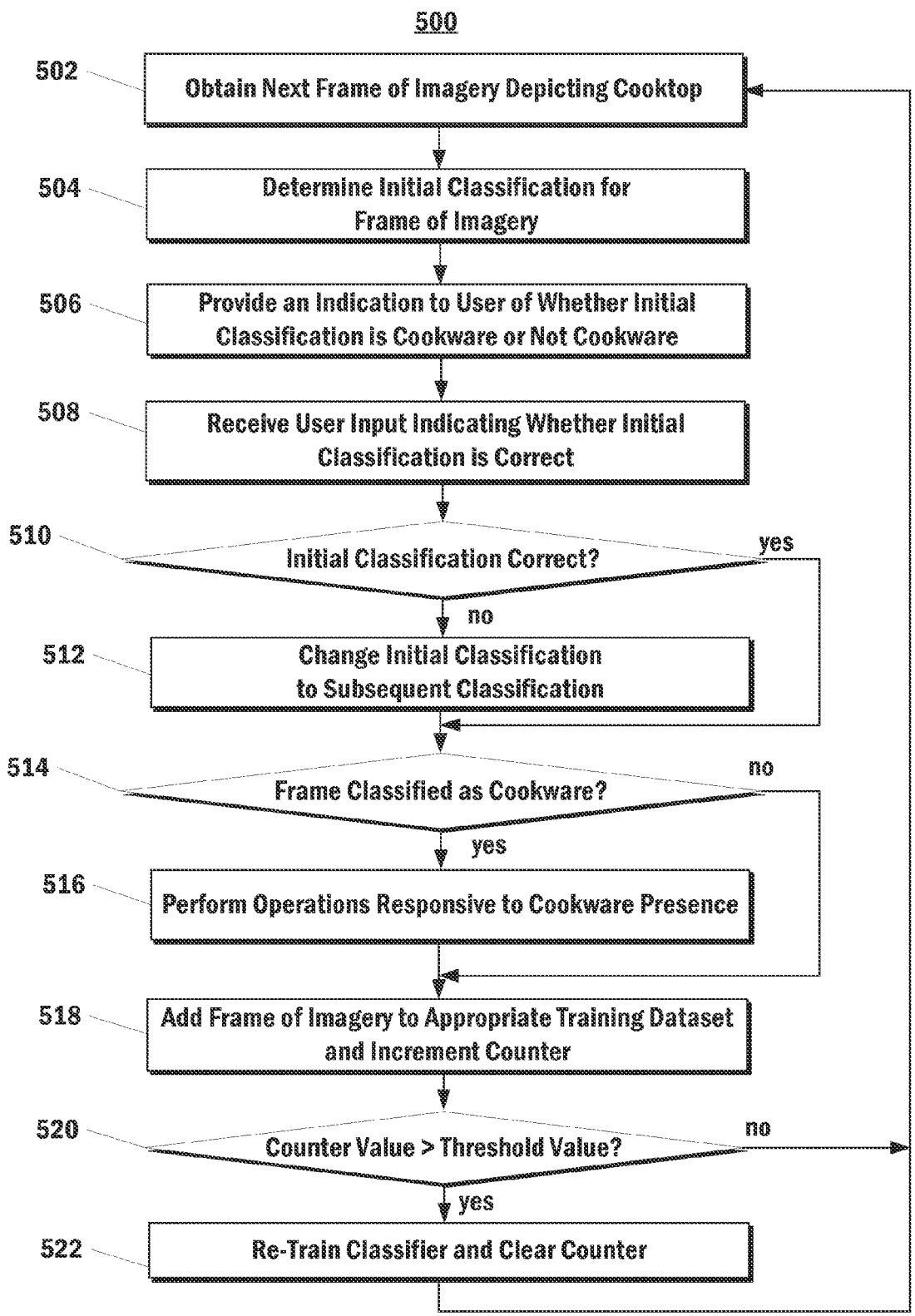
FIG. 5 depicts a flow chart of an example method for detecting cookware according to an example embodiment of the present disclosure.

FIG. 5 depicts a flow chart of an example method (500) for detecting cookware according to an example embodiment of the present disclosure. Although method (500) will be discussed with reference to system 100 of FIG. 1, method (500) can be performed by any suitable system.

In addition, FIG. 5 depicts steps performed in a particular order for purposes of illustration and discussion. Those of ordinary skill in the art, using the disclosures provided herein, will understand that the various steps of method (500) can be omitted, adapted, and/or rearranged in various ways without departing from the scope of the present disclosure.

At (502) the next frame of imagery depicting a cooktop can be obtained. For example, vision sensor 102 can be operated to capture a stream of frames of imagery. At (502) computing device 104 can obtain the next frame of imagery from the stream.

At (504) an initial classification can be determined for the frame of imagery obtained at (502). For example, computing device 104 can implement classifier module 118 to classify the frame of imagery as either depicting cookware or not depicting cookware.

At (506) an indication can be provided to a user whether the frame of imagery was initially classified as depicting cookware or not depicting cookware. For example, status indicator 122 can be operated to provide the indication to the user. The indication can be a visual indication, an audio indication, a haptic indication, or some other form of indication.

In some embodiments, the indication is only provided when the frame of imagery is classified as depicting cookware. Thus, the absence of an explicit visual, audio, or haptic indication may inform the user that the frame of imagery has been classified as not depicting cookware.

At (508) a user input can be received that indicates whether the initial classification is correct. For example, the user can provide the user input to the user interface 124 to indicate whether the initial classification is correct. The user input can be a voice command, a gesture, a press of one or more buttons or other indicators, or other input.

In some embodiments, receiving the user input at (508) can include pausing for a predetermined response period of time and determining whether user input was received during the response period of time. If user input was received during the response period of time, then the such action can interpreted as indicating that the initial classification was incorrect. For example, if the user presses a button included in user interface 124 within five seconds of status indicator 122 providing an indication that cookware was detected, then system 100 can interpret such input as indicating that the initial classification was incorrect.

Likewise, if user input is not received during the response period of time, then such user inaction can be interpreted as confirmation by the user that the initial classification is correct. Thus, in some embodiments, receiving the user input at (508) can include pausing for a period of time without receiving explicit user interaction.

At (510) it can be determined whether the initial classification was correct based on the user input received at (508). If it is determined that the initial classification was correct, then method (500) can advance to (514). However, if it is determined at (510) that the initial classification was not correct, then method (500) can advance to (512).

At (512) the initial classification for the frame of imagery can be changed to a subsequent classification. As an example, in the instance that the frame of imagery was initially classified as depicting cookware, then at (512) the frame of imagery can be provided with the subsequent classification of not depicting cookware. Likewise, in the instance that the frame of imagery was initially classified as not depicting cookware, then at (512) the frame of imagery can be provided with the subsequent classification of depicting cookware.

At (514) it can be determined whether the frame of imagery is currently classified as depicting cookware. If it is determined at (514) that the frame of imagery is classified as not depicting cookware, then method (500) can proceed to (518). However, if it determined at (514) that the frame of imagery is classified as depicting cookware, then method (500) can proceed to (516).

At (516) one or more operations can be performed in response to the detected presence of cookware. As an example, the one or more operations performed at (516) can include providing an status indication. For example, computing device 104 can operate status indicator 122 to provide an audio indication or a visual indication that cookware has been detected. As another example, the operations performed at (516) can include transmitting a communication to the cooktop that informs the cooktop of the presence of the detected cookware.

At (518) the frame of imagery can be added to an appropriate training dataset. For example, if the frame of imagery is classified as depicting cookware, then it can be added to the positive image training dataset. Likewise, if the frame of imagery is classified as not depicting cookware, then it can be added to the negative image training dataset.

Furthermore, at (518) a counter can be incremented. The counter can keep track of a number of frames of imagery that are added to either training dataset.

In addition, although method (500) includes adding each frame of imagery to one of the training dataset, it should be appreciated that method (500) can readily be modified so that only frames of imagery that satisfy certain criteria are added to one of the training datasets. As an example, only frames of imagery classified as depicting cookware can be added to the corresponding training dataset (e.g. positive training dataset). As another example, only frames of imagery for which the classification was changed in response to user input can be added to their corresponding training dataset. As yet another example, only frames of imagery for which the classification was changed to depicting cookware in response to user input can be added to their corresponding training dataset.

At (520) it can be determined whether the counter value is greater than a threshold value. For example, the threshold value can be zero or a positive integer. In some embodiments, the threshold value can be adjustable or self-adjusting based on current processing constraints and/or requirements.

If it is determined at (520) that the counter value is not greater than the threshold value, then method (500) can return (502) and obtain the next frame of imagery.

However, if it is determined at (520) that the counter value is greater than the threshold value, then method (500) can proceed to (522). At (522) the classifier can be re-trained and the counter can be cleared. For example, computing device 104 can implement classifier training module 116 to re-train classifier module 118. In particular, the classifier module 118 will be re-trained in light of the training datasets as supplemented by any additional imagery contributed to the training datasets since the most recent re-training. In such fashion, system 100 can be periodically retrained on additional imagery specific to the user's cooktop and cookware, thereby continually improving its classification accuracy.

After (522), method (500) can return to (502) and obtain the next frame of imagery. In such fashion, each frame from a stream of frames of imagery can be analyzed to detect the presence of cookware.

Figure 6A:
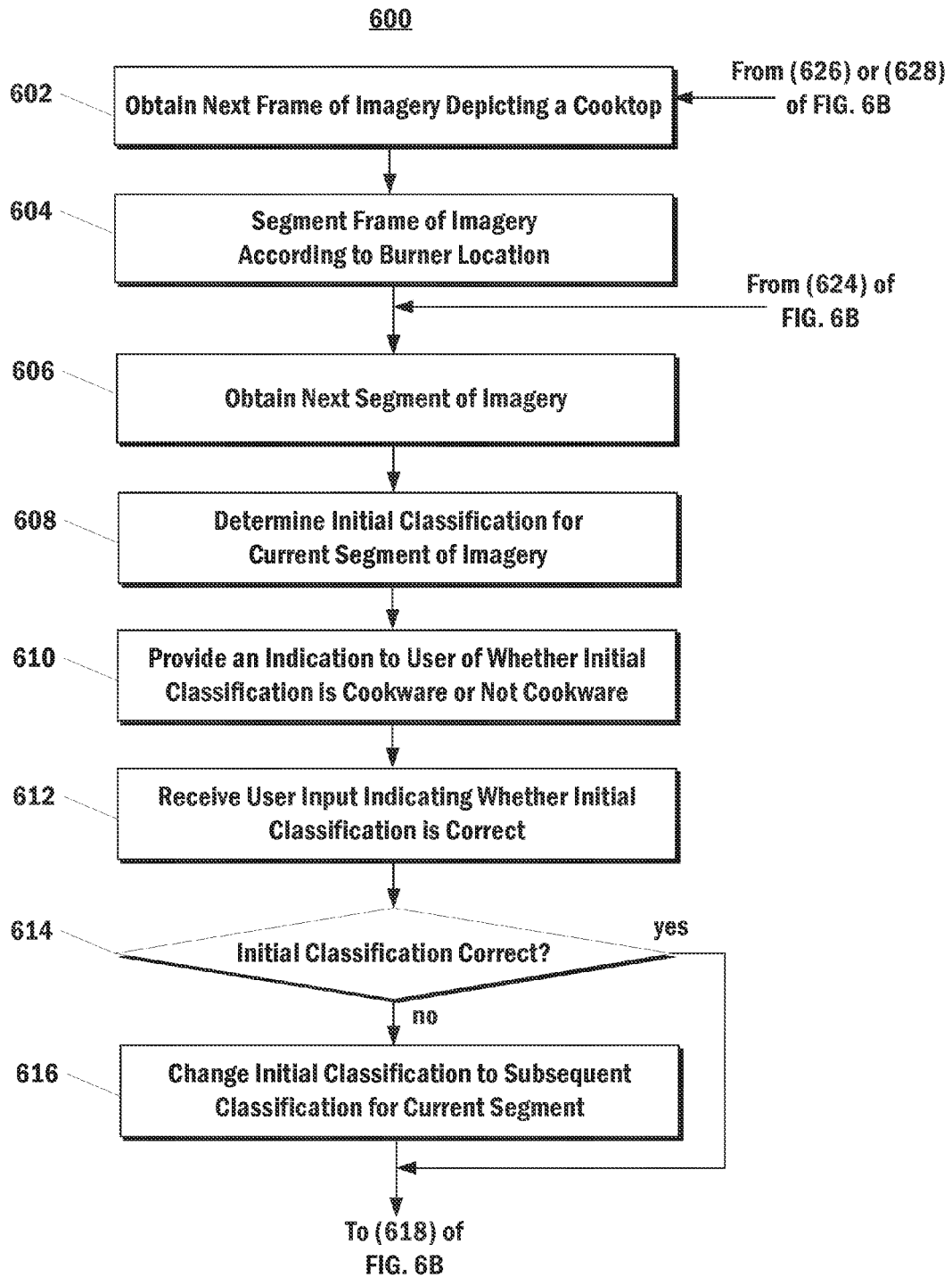
FIGS. 6A and 6B depict a flow chart of an example method for detecting cookware according to an example embodiment of the present disclosure.
Figure 6B:
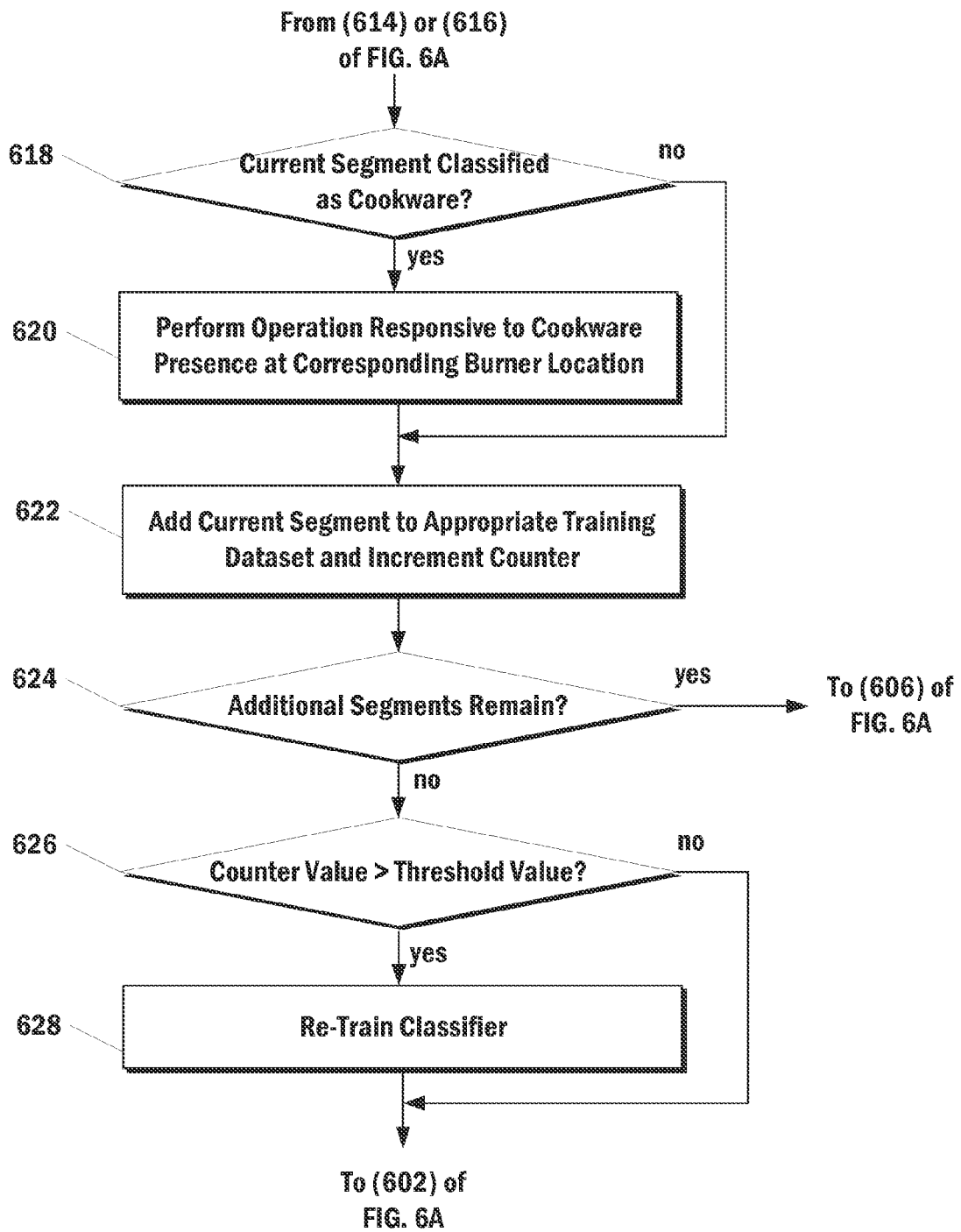

FIGS. 6A and 6B depict a flow chart of an example method (600) for detecting cookware according to an example embodiment of the present disclosure. Although method (600) will be discussed with reference to system 100 of FIG. 1, method (600) can be performed by any suitable system.

In addition, FIGS. 6A and 6B depict steps performed in a particular order for purposes of illustration and discussion. Those of ordinary skill in the art, using the disclosures provided herein, will understand that the various steps of method (600) can be omitted, adapted, and/or rearranged in various ways without departing from the scope of the present disclosure.

Referring to FIG. 6A, at (602) the next frame of imagery depicting the cooktop can be obtained. For example, vision sensor 102 can be operated to capture a stream of frames of imagery. At (602) computing device 104 can obtain the next frame of imagery from the stream.

At (606) the frame of imagery obtained at (602) can be segmented according to burner location. For example, computing device 104 may have knowledge of the respective locations of one or more burners due to, for example, performance of a calibration routine. Thus, at (606) the frame of imagery obtained at (602) can be segmented into a plurality of segments based on such burner locations.

For example, the frame of imagery can be cropped into segments directly corresponding to the burner locations. Each of such segments of imagery can be associated with the burner at the corresponding location.

In some embodiments, a calibration process may not have been previously performed to identify the burner locations. In such embodiments, background subtraction can be performed for the frame obtained at (602) with respect to a reference image depicting the cooktop without any objects placed thereon, such that new imagery can be extracted. The new imagery can then be segmented to identify one or more segments that respectively correspond to one or more burner locations.

At (606) the next segment of new imagery can be obtained. For example, each segment can be considered individually. Therefore, at (606) the next segment can be obtained and considered.

At (608) an initial classification can be determined for the segment of imagery most recently obtained at (606). As an example, computing device 104 can implement classifier module 118 to classify the segment as either depicting cookware or not depicting cookware.

In particular, in some embodiments, classifier module 118 can calculate a cookware score for the segment. The cookware score can be based on application of a plurality of feature criteria to the segment. For example, the a plurality of planes respectively associated with the plurality of feature criteria can be used to generate the cookware score. Classifier module 118 can then classify the segment on the basis of the cookware score (e.g. by comparing to a threshold score).

At (610) an indication can be provided to a user that indicates whether the segment of imagery was initially classified as depicting cookware or not depicting cookware. For example, status indicator 122 can be operated to provide the indication to the user. The indication can be a visual indication, an audio indication, a haptic indication, or some other form of indication.

In some embodiments, the indication is only provided when the segment of imagery is classified as depicting cookware. Thus, the absence of an explicit visual, audio, or haptic indication may inform the user that the segment of imagery has been classified as not depicting cookware.

At (612) a user input can be received that indicates whether the initial classification is correct. For example, the user can provide the user input to the user interface 124 to indicate whether the initial classification is correct. The user input can be a voice command, a gesture, a press of one or more buttons or other indicators, or other input.

In some embodiments, receiving the user input at (508) can include pausing for a predetermined response period of time and determining whether user input was received during the response period of time. If user input was received during the response period of time, then the such action can be interpreted as indicating that the initial classification was incorrect. For example, if the user presses a button included in user interface 124 within fifteen seconds of status indicator 122 providing an indication that cookware was detected, then system 100 can interpret such input as indicating that the initial classification was incorrect.

Likewise, if user input is not received during the response period of time, then such user inaction can be interpreted as confirmation by the user that the initial classification is correct. Thus, in some embodiments, receiving the user input at (508) can include pausing for a period of time without receiving explicit user interaction.

At (614) it can be determined whether the initial classification was correct based on the user input received at (612). If it is determined that the initial classification was correct, then method (600) can advance to (618) of FIG. 6B. However, if it is determined at (614) that the initial classification was not correct, then method (600) can advance to (616).

At (616) the initial classification for the segment of imagery can be changed to a subsequent classification. As an example, in the instance that the segment of imagery was initially classified as depicting cookware, then at (616) the segment of imagery can be provided with the subsequent classification of not depicting cookware. Likewise, in the instance that the segment of imagery was initially classified as not depicting cookware, then at (616) the segment of imagery can be provided with the subsequent classification of depicting cookware.

Referring now to FIG. 6B, at (618) it can be determined whether the segment of imagery is currently classified as depicting cookware. If it is determined at (618) that the frame of imagery is classified as not depicting cookware, then method (600) can proceed to (622). However, if it determined at (618) that the frame of imagery is classified as depicting cookware, then method (600) can proceed to (620).

At (620) one or more operations can be performed in response to the detected presence of cookware. The performed operation(s) can be responsive to the presence of cookware at the burner location that corresponds to the current segment of imagery.

As an example, the one or more operations performed at (620) can include providing an status indication. For example, computing device 104 can operate status indicator 122 to provide an audio indication or a visual indication that cookware has been detected.

As another example, the operations performed at (620) can include transmitting a communication to the cooktop that informs the cooktop of the presence of the detected cookware. The communication can identify one or more of a plurality of burners included in the cooktop upon which the detected cookware is positioned.

At (622) the frame of imagery can be added to an appropriate training dataset. For example, if the frame of imagery is classified as depicting cookware, then it can be added to the positive image training dataset. Likewise, if the frame of imagery is classified as not depicting cookware, then it can be added to the negative image training dataset.

Furthermore, at (622) a counter can be incremented. The counter can keep track of a number of frames of imagery that are added to either training dataset.

In addition, although method (600) includes adding each segment of imagery to one of the training dataset, it should be appreciated that method (600) can readily be modified so that only segments of imagery that satisfy certain criteria are added to one of the training datasets. As an example, only segments of imagery classified as depicting cookware can be added to the corresponding training dataset (e.g. positive training dataset). As another example, only segments of imagery for which the classification was changed in response to user input can be added to their corresponding training dataset. As yet another example, only segments of imagery for which the classification was changed to depicting cookware in response to user input can be added to their corresponding training dataset.

Furthermore, in some embodiments, the positive and negative image training datasets can be separated or otherwise grouped into images corresponding to each of the burner locations. Thus, for example, a plurality of positive image training datasets can exist and be respectively associated with the plurality of burners, thereby providing burner-specific training. In such embodiments, adding the current segment to the appropriate training dataset at (622) can include adding the current segment to one of such burner-specific training datasets based on the burner with which such segment is associated.

At (624) it can be determined whether additional segments of imagery remain unclassified. If it is determined at (624) that additional segments of imagery remain, then method (600) can return to (606) of FIG. 6A and obtain the next segment of imagery. In such fashion, each segment of imagery identified at (604) of FIG. 6A can be individually considered and classified. In such fashion, cookware detection can be performed on a burner-by-burner basis.

Furthermore, it will be understood that, in some embodiments, step (624) can be performed prior to (620), such that the presence of cookware can be determined for each burner prior to performing responsive operations.

However, if it is determined at (624) that additional segments of imagery do not remain, then method (600) can proceed to (626).

At (626) it can be determined whether the counter value is greater than a threshold value. For example, the threshold value can be zero or a positive integer. In some embodiments, the threshold value can be adjustable or self-adjusting based on current processing constraints and/or requirements.

If it is determined at (626) that the counter value is not greater than the threshold value, then method (600) can return (602) of FIG. 6A and obtain the next frame of imagery.

However, if it is determined at (626) that the counter value is greater than the threshold value, then method (600) can proceed to (628). At (628) the classifier can be re-trained and the counter can be cleared. For example, computing device 104 can implement classifier training module 116 to re-train classifier module 118. In particular, the classifier module 118 will be re-trained in light of the training datasets as supplemented by any additional imagery contributed to the training datasets since the most recent re-training. In such fashion, system 100 can be periodically retrained on additional imagery specific to the user's cooktop and cookware, thereby continually improving its classification accuracy. Further, in some embodiments, the re-training can be burner-specific.

After (628), method (600) can return to (602) of FIG. 6A and obtain the next frame of imagery depicting the cooktop. In such fashion, a stream of images collected by the vision sensor can be individually analyzed and classified to detect cookware.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for detecting cookware, the method comprising:
   identifying, by one or more computing devices, one or more locations respectively associated with one or more burners included in a cooktop, wherein identifying, by one or more computing devices, the one or more locations respectively associated with the one or more burners comprises:
   obtaining, by the one or more computing devices, a reference frame of imagery depicting the cooktop without any objects placed thereon;
   obtaining, by the one or more computing devices, one or more calibration frames of imagery depicting the cooktop with one or more items of cookware respectively positioned at the one or more locations respectively associated with the one or more burners, wherein the one or more calibration frames of imagery are captured when motion is not detected at the cooktop;
   performing, by the one or more computing devices, background subtraction for at least one of the one or more calibration frames of imagery with respect to the reference frame of imagery to identify new imagery; and
   segmenting, by the one or more computing devices, the new imagery to identify the one or more locations respectively associated with the one or more burners included in the cooktop;
   obtaining, by the one or more computing devices, a frame of imagery captured by a vision sensor, wherein the frame of imagery either depicts cookware on the cooktop, or does not depict cookware on the cooktop;
   segmenting, by the one or more computing devices, the frame of imagery into one or more image segments based at least in part on the one or more locations respectively associated with the one or more burners included in the cooktop;
   using, by the one or more computing devices, a classifier to provide an initial classification for each of the one or more image segments of the frame of imagery, the initial classification for each of the one or more image segments classifying the one or more image segments into either a first class of images depicting cookware or a second class of images not depicting cookware, wherein classification of one of the one or more image segments into the first class of images corresponds to detection of cookware on the cooktop;
   providing, by the one or more computing devices for at least one of the one or more image segments, an indication to a user of whether the initial classification for such image segment comprises the first class or the second class;
   after providing the indication for at least one of the one or more image segments, receiving, by the one or more computing devices, a user input indicating whether the initial classification for such image segment is correct; and
   when the user input indicates that the initial classification for one of the one or more image segments is not correct, changing, by the one or more computing devices, the initial classification for such image segment to a subsequent classification, wherein the subsequent classification comprises the second class when the initial classification comprises the first class, and wherein the subsequent classification comprises the first class when the initial classification comprises the second class.

2. The method of claim 1, wherein:
   the first class of images comprises a positive image training dataset upon which the classifier was trained, the positive image training dataset comprising Images that depict cookware; the second class of images comprises a negative image training dataset upon which the classifier was trained, the negative image training dataset comprising images that do not depict cookware; and the method further comprises:
   adding, by the one or more computing devices, each of the one or more image segments for which the subsequent classification comprises the first class to the positive image training dataset; and
   adding, by the one or more computing devices, each of the one or more image segments for which the subsequent classification comprises the second class to the negative image training dataset.

3. The method of claim 2, wherein the method further comprises, after adding each of the one or more image segments to either the positive image training dataset or the negative image training dataset, re-training the classifier based at least in part on the positive image training dataset and the negative image training dataset.

4. The method of claim 3, wherein:
   the classifier provides the initial classification for each of the one or more image segments based on a plurality of planes respectively associated with a plurality of image features; and re-training the classifier based at least in part on the positive image training dataset and the negative image training dataset comprises recomputing the plurality of planes.

5. The method of claim 1, wherein receiving, by the one or more computing devices, the user input indicating whether the initial classification is correct comprises:
   after providing the indication, pausing, by the one or more computing devices, for a response period of time;
   interpreting, by the one or more computing devices, a receipt of user input during the response period of time as indicating that the initial classification is not correct; and
   interpreting, by the one or more computing devices, an absence of user input during the response period of time as indicating that the initial classification is correct.

6. The method of claim 1, wherein receiving, by the one or more computing devices, a user input comprises receiving, by the one or more computing devices, data describing a voice command provided by the user, data describing one or more buttons pressed by the user, or data describing a gesture performed by the user.

7. The method of claim 1, further comprising, prior to using, by the one or more computing devices, the classifier to provide the initial classification for each of the one or more image segments:

obtaining, by the one or more computing devices, a first plurality of images captured by the vision sensor, wherein the first plurality of images depict cookware upon the cooktop;

storing, by the one or more computing devices, the first plurality of images in a memory as a positive image training dataset;

obtaining, by the one or more computing devices, a second plurality of images captured by the vision sensor, wherein the second plurality of images do not depict cookware upon the cooktop;

storing, by the one or more computing devices, the second plurality of images in the memory as a negative image training dataset; and training, by the one or more computing devices, the classifier based at least in part on the positive image training dataset and the negative image training dataset.

8. A system for detecting cookware, the system comprising:

a vision sensor positioned so as to collect imagery depicting a cooktop;

one or more processors; and one or more non-transitory computer-readable media storing instructions that, when executed by the one or more processors, cause the one or more processors to perform operations, the operations comprising:

obtaining a first plurality of images, wherein the first plurality of images depict cookware upon the cooktop;

storing the first plurality of images in a memory as a positive image training dataset;

obtaining a second plurality of images, wherein the second plurality of images do not depict cookware upon the cooktop;

storing the second plurality of images in the memory as a negative image training dataset;

training a classifier based on the positive image training dataset and the negative image training dataset;

identifying one or more locations respectively associated with one or more burners included in the cooktop, wherein identifying, by one or more computing devices, the one or more locations respectively associated with the one or more burners comprises:

obtaining a reference frame of imagery depicting the cooktop without any objects placed thereon;

obtaining one or more calibration frames of imagery depicting the cooktop with one or more items of cookware respectively positioned at the one or more locations respectively associated with the one or more burners, wherein the one or more calibration frames of imagery are captured when motion is not detected at the cooktop;

performing background subtraction for the one or more calibration frames of imagery with respect to the reference frame of imagery to identify new imagery; and segmenting the new imagery to identify the one or more locations respectively associated with the one or more burners;

segmenting a frame of imagery captured by the vision sensor into one or more image segments based at least in part on the one or more locations respectively associated with the one or more burners included in the cooktop;

using the classifier to provide an initial classification for each of the one or more image segments, the initial classification for each of the one or more image segments classifying such image segment into either a first class of images depicting cookware or a second class of images not depicting cookware, wherein classification of one or more image segments into first class of images corresponds to detection of cookware on cooktop.

9. The system of claim 8, wherein the operations further comprise:

providing an indication to a user of whether the initial classification for at least one of the one or more image segments comprises the first class or the second class;

after providing the indication, receiving a user input indicating whether the initial classification is correct; and when the user input indicates that the initial classification is not correct, changing the initial classification for the frame of imagery to a subsequent classification, wherein the subsequent classification comprises the second class when the initial classification comprises the first class, and wherein the subsequent classification comprises the first class when the initial classification comprises the second class.

10. The system of claim 9, wherein the operations further comprise:

adding the frame of imagery to the positive image training dataset when the subsequent classification comprises the first class;

adding the frame of imagery to the negative image training dataset when the subsequent classification comprises the second class; and re-training the classifier based at least in part on the positive image training dataset and the negative image training dataset.

11. The system of claim 8, wherein the operations further include, prior to obtaining the first plurality of images, providing one or more prompts to a user to place one or more items of cookware on the cooktop.

12. A system for detecting cookware, the system comprising:

a vision sensor positioned so as to collect a plurality of images of a cooktop;

a calibration module implemented by one or more processors, the calibration module configured to:

obtain reference imagery depicting the cooktop without objects placed thereon;

obtain calibration imagery depicting the cooktop with one or more items of cookware respectively placed on one or more burners included in the cooktop; wherein the calibration imagery is captured only when motion is not detected at the cooktop;

perform background subtraction for the calibration imagery with respect to the reference imagery to identify new imagery; and segment the new imagery to identify one or more locations respectively associated with the one or more burners;

a classifier module implemented by the one or more processors, the classifier module configured to:

calculate a cookware score for each of the plurality of images; and use the cookware score for each of the plurality of images to respectively classify each of the plurality of the images as either depicting cookware or not depicting cookware, wherein classification of one of the plurality of images as depicting cookware corresponds to detection of cookware at the cooktop; and a classifier training module implemented by the one or more processors, the classifier training module configured to train the classifier module based at least in part on a positive image training dataset and a negative image training dataset.

13. The system of claim 12, wherein the calibration module is further configured to:
   obtain a first plurality of images captured by the vision sensor, wherein the first plurality of images depict cookware upon the cooktop;
   store the first plurality of images in a memory as the positive image training dataset;
   obtain a second plurality of images captured by the vision sensor, wherein the second plurality of images do not depict cookware upon the cooktop; and
   store the second plurality of images in the memory as the negative image training dataset.

14. The system of claim 12, wherein the classifier module comprises a support vector machine.

15. The system of claim 12, further comprising:
   a staus indicator configured to respectively provide an indication of the classification provided for each of the plurality of images by the classifier module;
   a user interface for receiving a user input, wherein the user input indicates whether the classification provided for each of the plurality of images by the classifier module is correct;
   wherein the classifier module is further configured to change the classification provided for each of the plurality of images for which the corresponding user input indicates that the classification provided for such image is not correct.

16. The system of claim 15, wherein: the calibration module is further configured to add each of the plurality of images for which the corresponding user input indicates that the classification provided for such image is not correct into either the positive image training dataset or the negative image training dataset, and
   the classifier training module is further configured to re-train the classifier module based at least in part on the positive image training dataset and the negative image training dataset after the calibration module has added each of the plurality of images for which the corresponding user input indicates that the classification provided for such image is not correct.

* * * * *